United States Patent [19]
Fletcher

[11] Patent Number: 5,113,290
[45] Date of Patent: May 12, 1992

[54] SEALED FOCUSING ASSEMBLY FOR AN INDUSTRIAL VISION SYSTEM

[75] Inventor: Thomas A. Fletcher, Freeport, Ill.

[73] Assignee: Honeywell Inc., Minneapolis, Minn.

[21] Appl. No.: 626,840

[22] Filed: Dec. 13, 1990

[51] Int. Cl.⁵ .................................................. G02B 7/02
[52] U.S. Cl. ................................... 359/823; 359/894; 250/239
[58] Field of Search .............. 350/319, 252, 255, 429, 350/589, 96.15, 96.18; 359/399; 250/239, 216

[56] References Cited

U.S. PATENT DOCUMENTS

| | | | |
|---|---|---|---|
| 3,246,563 | 4/1966 | Quammen et al. | 88/57 |
| 3,558,220 | 1/1971 | Werner | 359/894 |
| 3,740,114 | 6/1973 | Thompson | 359/399 |
| 4,055,761 | 10/1977 | Shimomura | 250/239 |
| 4,116,529 | 9/1978 | Yamaguchi | 359/894 |
| 4,215,916 | 8/1980 | Bell et al. | 359/894 |
| 4,640,579 | 2/1987 | Takizawa | 359/823 |
| 4,718,750 | 1/1988 | Forkey | 359/823 |
| 4,818,067 | 4/1989 | Maisenbacher | 359/823 |
| 4,923,281 | 5/1990 | Kirchever | 359/811 |

Primary Examiner—Loha Ben
Attorney, Agent, or Firm—William D. Lanyi

[57] ABSTRACT

A sealed focusing assembly for an industrial vision system according to the present invention is comprised of a main housing in threaded contact with an adjustment ring, and in rotatable contact with a lens sleeve. An O-ring functions to frictionally prevent the lens sleeve from rotating as the assembly is focused by rotation of the adjustment ring and the lens sleeve is axially advanced. The O-ring also functions to form a gaseous-tight seal within the focusing assembly. The use of an additional O-ring provides the assembly with superior seal integrity.

12 Claims, 1 Drawing Sheet

SEALED FOCUSING ASSEMBLY FOR AN INDUSTRIAL VISION SYSTEM

BACKGROUND OF THE INVENTION

The present invention relates to industrial vision systems, and more particularly to a sealed focusing assembly for an industrial vision system.

In the early 1960's industrial automation underwent a revolution with the advent of practical industrial robots. As technology has advanced, industrial robots have become more sophisticated. One area of technology that is currently undergoing remarkable change is the area of sensory means for industrial applications, particularly robots.

In order to function properly in the workplace, industrial robots must be able to detect the environment they operate within. Robotic sensing may be tactile in nature, such as where a robot physically contacts its work environment and responds to the contact forces. Alternatively, non-contact sensing may be employed. Such non-contact sensing means employ either proximity sensors, that are sensitive to the distances between objects, or vision sensors, such as cameras. Naturally, non-contact sensors are preferable in many situations, such as where a sensing system is employed for manufacturing that requires extremely accurate tolerances.

Industrial vision systems are based on the processing and interpreting of electrooptical images. Frequently, such systems are part of an industrial robot that may be programmed to carry out a large variety of tasks. Often such vision systems utilize multiple visions sensors, such as cameras, sending multiple sensory signals to a computer for sorting and processing.

A fundamental component of any industrial vision system is the focusing assembly which contains a lens or lens assembly, that is directed at the item that it is desired to view. The "objective" is the focusing assembly which contains the lens that is exposed to the environment, and which comes in first contact with the light from the item being viewed. The objective forms an image of the object at its focal point. If a lens assembly is employed, multiple lenses are arranged in order to rotate, or magnify the images produced by the lenses.

Depending on the particular lens orientation and assembly, the focal length of the focusing assembly will vary. Thus, if the distance between the item to be viewed and the focusing assembly of the vision system is changed, the vision system will have to be focused. Focusing may take place by adjusting the focusing assembly in order to change the distance between the lens assembly and the optical detector, the device that is sensitive to the light transmitted by the lens assembly. Such adjustment can take many forms, for example by cam motive means or by threaded motive means located between the lens assembly and the optical detector within the focusing assembly. Industrial vision systems, and more generally, focusing assemblies and their methods of operation are known in the art. For example, Forkey discloses a Fluid Sealed Lens Mounting System in U.S. Pat. No. 4,718,750, comprising a body assembly, a carrier and lens carried within the carrier, which is focused by cam operation.

Industrial vision systems are currently used in many industries for a variety of applications. For example, vision systems may be used in industrial manufacturing to inspect, identify and count parts. When combined with an automated robot assembly, industrial vision systems may be used to guide robots so they can sort, position, orient and test parts and assemblies.

In addition to manufacturing, industrial vision systems have been utilized during post-manufacturing, such as for quality control of finished parts. Vision systems may be used to check shape and size defects, the number and size of components, and to measure critical dimensions of finished components such as surface integrity, thus allowing the rejection of unsatisfactory components.

Many industries have utilized industrial vision systems in manufacturing and quality control. The automobile industry was the first to use automated robots generally. The industry has used robots that employ vision systems for a number of applications such as welding of sheet metal parts, and the manufacture of transmissions, engines, plastic body panels, dash boards and electrical systems.

Other industries such as the electronics and aviation industries have utilized industrial vision systems for manufacturing items such as printed circuit boards or keyboards, and bearings, motors and relays.

Industrial robots that employ vision systems have several benefits over their human predecessors. Vision systems may ensure high quality products as the systems are capable of being extremely accurate and are designed for repeatability, often at high speeds. The vision systems also allow automatic, accurate and safe handling and control of materials, whether the materials are hazardous or not. In addition, if the systems are small enough, they can be located in almost any position and, in environments that would otherwise be hostile to humans, such as at extremely high temperatures, often necessary for manufacturing.

However, certain inherent characteristics of industrial vision systems cause problems that the industry has attempted to resolve. For example, many of the current industrial vision systems work in operating environments where they may encounter dirt, gas fumes, fluids, dust, chips, weld splatter, etc. Due to the need to axially shift a lens assembly within the focusing assembly in order to focus the vision system it is necessary to have separate housings for the lens assembly and the optical detector so they can be moved with respect to one another. Thus, the location where the housings connect is a potential entry way for debris from the work environment, which may damage or otherwise interfere with their proper operation.

Additionally, changes in the temperature and humidity of the work environment may cause condensation on the lens assembly. Of course, such potential debris and condensation on the lens assembly may render a vision system inaccurate, and therefore, useless. These problems have created the need for systems that are sealed from the work environment. Typically, vision systems used in industrial applications in which sealing of the lens/housing assembly is a requirement use the following methods to seal: an unsealed camera may be placed in a sealed enclosure with a window; other, more sophisticated units, use specially sealed lenses which are capable of only splash resistant sealing; still others, use unwieldy and complicated assemblies and sub-assemblies that require the detector be positioned to allow focusing, such as that disclosed in the Forkey patent, mentioned previously, and Quammen et al, U.S. Pat. No. 3,246,563, where a bellows type seal is employed.

Another problem encountered occurs when extremely high accuracy, i.e. tight tolerances, are necessary. The structure of most lens assemblies is such that when the lens is focused, generally by rotation of an adjustment ring, the lens itself is concurrently rotated. Therefore, concentricity tolerances between the lens and the housing assemblies must be extremely accurate to prevent target misalignment during focusing. Quammen et al, U.S. Pat. No. 3,246,563 discloses a telescopic eyepiece assembly in which the lens moves only axially upon rotation of the adjusting ring. However, this is accomplished in the context of a complex, bellows-type arrangement that is large and unsatisfactory.

SUMMARY OF THE INVENTION

A sealed focusing assembly for an industrial vision system according to the present invention is comprised of a main housing, a lens sleeve, an adjustment ring, a locking ring, O-rings, and a fixed focus lens assembly. An O-ring functions to prevent the lens sleeve from rotating as the assembly is focused by rotation of the adjustment ring and the lens sleeve is axially advanced, and also serves to seal the assembly from fluids and dirt in the work environment. The use of an additional O-ring proximate the lens assembly combined with the simple structure of the focusing assembly provides the focusing assembly with superior seal integrity.

An object of the present invention is to provide an improved sealed focusing assembly for industrial vision systems in which focusing in a sealed environment is carried out simply and inexpensively by means of frictional and rotational interaction such that the lens may be axially advanced without being rotated.

The foregoing and other objects, features, aspects and advantages of the present invention will become more apparent from the following detailed description of the present invention when taken in conjunction with the accompanying drawings.

BRIEF DESCRIPTION OF THE DRAWINGS

The attached drawings illustrate a presently preferred embodiment of the present invention, wherein like numerals refer to like elements in the various vies and wherein.

DESCRIPTION OF THE PREFERRED EMBODIMENT

Figure 1:
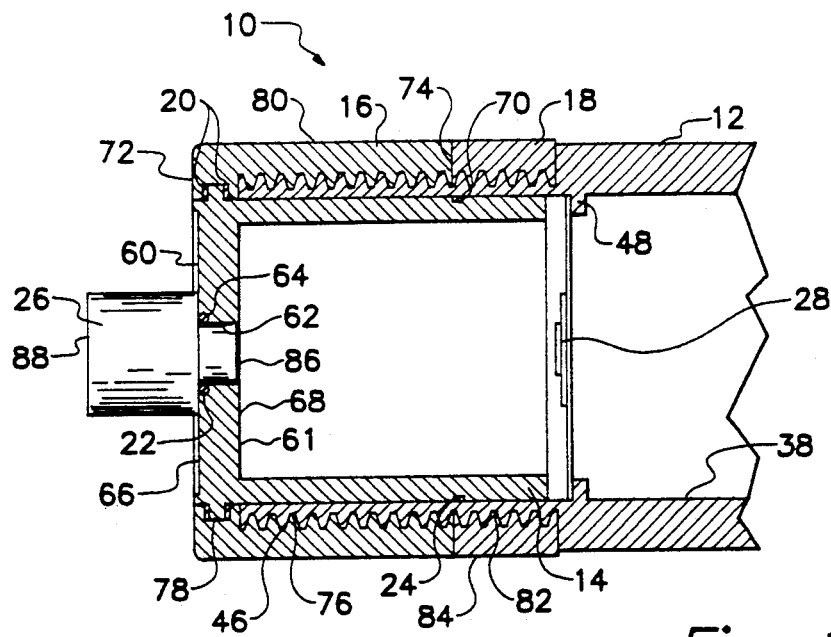
FIG. 1 is a longitudinal sectional view of an assembled sealed focusing means for an industrial vision system.

Referring to FIG. 1, an exemplary sealed focusing assembly for industrial vision systems is shown as assembled. The focusing assembly 10 is comprised of a main housing 12, a lens sleeve 14, an adjustment ring 16, a locking ring 18, anti friction washers 20, O-rings 22 and 24, and a fixed focus lens assembly 26. An optical detector 28 is shown, but comprises no part of the current invention.

Figure 2:
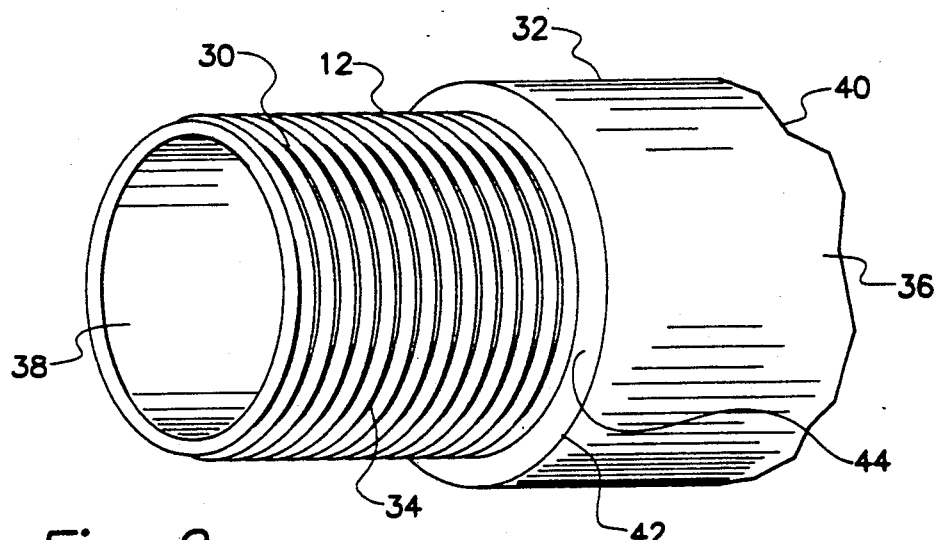
FIG. 2 is a perspective view of a housing for a sealed focusing means for an industrial vision system.

Referring now to FIG. 2, it can be seen that the main housing 12 is elongated and is generally cylindrical in shape. Housing 12 is comprised of a first portion 30 and a second portion 32. Portions 30 and 32 are themselves cylindrical in shape. In addition, portions 30 and 32 are integrally formed, although embodiments in which each portion is separately formed and then joined in some conventional manner, is conceivable.

Portions 30 and 32 have surfaces 34 and 36 respectively, and a common inner smooth cylindrical surface 38. The outer diameter of second portion 32 is slightly larger than the outer diameter of first portion 30. Second portion 32 has an open lower end 40 and an open upper end 42, upper end 42 defining an external annular shoulder 44. First portion 30 has external threads 46 along its length as shown in FIG. 1. Referring again to FIG. 1, inner surface 38 extends continuously throughout the entire length of housing 12, except for an internal annular flange 48, located proximate lower end 40.

Figure 3:
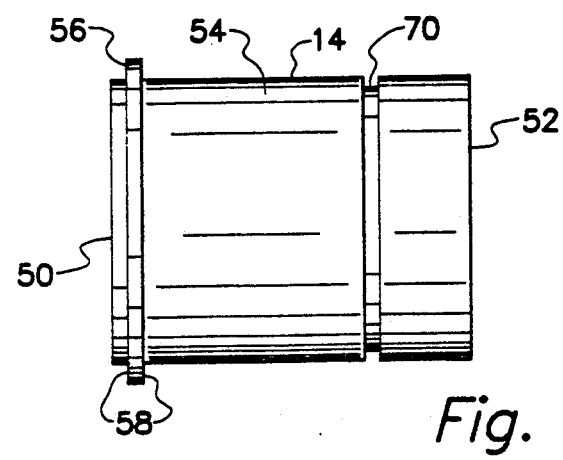
FIG. 3 is a lateral side view of a lens sleeve for a sealed focusing means for an industrial vision system.

Turning now to FIG. 3, lens sleeve 14 is also elongated and generally cylindrical in shape. Sleeve 14 has an open front end 50 and an open rear end 52. Sleeve 14 has an outer surface 54 with an exterior diameter slightly less than the diameter of inner surface 38 of housing 12, allowing sleeve 14 to be rotatably disposed within housing 12.

Proximate the front end of sleeve 14 is an external annular flange 56 defining two external shoulders 58. End wall 60 is located proximate front end 50, and slightly removed in an axial direction toward rear end 52 as shown in FIG. 1. Lens sleeve 14, flange 56 and end wall 60 are preferably integrally formed, however, they may also be separately formed and connected.

Referring again to FIG. 1, end wall 60 defines an internal annular flange 61 extending radially inward into lens sleeve 14, and having a front surface 66 and a rear surface 68. Flange 61 defines a bore 62 through the depth of flange 61 and radially centered within lens sleeve 14. Counterbore 64 in the front surface 66 of annular flange 61 is coaxial with bore 62 and has a diameter slightly greater than the diameter of bore 62. Counterbore 64 is great enough in diameter and depth to allow insertion of resilient O-ring 22 into counterbore 64. Annular groove 70 in the outer surface 54 of lens sleeve 14 is located proximate rear end 52, and is great enough in depth and width to facilitate insertion of resilient O-ring 24.

Adjustment ring 16 is cylindrical in shape and elongated, though not as great in length as the lens sleeve 14. Outer surface 80 has a diameter approximately the same as the outer diameter of second portion 32 of housing 12. Adjustment ring 16 has an open front end 72 and open rear end 74. Internal annular groove 78 is located proximate front end 72 of adjustment ring 16. Adjustment ring 16 has internal threads 76 throughout most of its length beginning at rear end 74 to a location proximate internal annular groove 78. Internal threads 76 are adapted to engage external threads 46 of housing 12.

Locking ring 18 is also cylindrical in shape, and slightly elongated and open at each end. Internal threads 82 extend continuously throughout locking ring 18. Both the external surface 84 of locking ring 18, and the external surface 80 of adjustment ring 16 are knurled for ease of grasping. Annular shoulder 44 of housing 12 acts to limit the axial movement of locking ring 18.

Lens assembly 26 is typical and is comprised of at least an objective lens 88, and an end 86 opposite the objective 88.

Components of the focusing assembly interact as follows. Lens sleeve 14 is coaxial with housing 12 and is rotatably disposed and in contact with the inner cylindrical surface 38 of housing 12. Resilient O-ring 24 fits snugly within annular groove 70 of lens sleeve 14. Annular flange 56 of lens sleeve 14 along with two anti-friction washers 20 are adapted to fit within annular groove 78 of adjustment ring 16, forming a rotatable connection. Interaction of the annular groove 78, annular flange 56, and annular shoulders 58 allow for the proper axial interlocking relationship between lens sleeve 14 and adjustment ring 16 necessary for axial movement. Anti-friction washers 20 facilitate the rotatable relationship between adjustment ring 16 and lens sleeve 14.

As shown in FIG. 1, an optical detector 28 may be fixedly attached to rear end 52 of lens sleeve 14. Alternatively, optical detector may be attached in another manner. In the embodiment shown in FIG. 1, optical detector 28 is also in axial contact with internal annular flange 48 of housing 12. Adjustment ring 16 and locking ring 18 are coaxial with housing 12 and lens sleeve 14. Internal threads 76 and 82 of adjustment ring 16 and locking ring 18 are adapted to threadedly engage external threads 46 of housing 12. In addition, resilient O-ring 24 is in tight, frictional contact with inner surface 38 of housing 12, and forms a gaseous-tight seal between the housing 12 and the lens sleeve 14.

Fixed focus lens assembly 26 is adapted to be fixedly attached to lens sleeve 14 by partial insertion in bore 62 of end wall 60 of lens sleeve 14. Orientation of lens assembly 26 must be such that end 86 opposite objective 88 is in luminous contact with optical detector 28 such that light may be freely transmitted from the lens assembly 26 to the optical detector 28. Resilient O-ring 22 is inserted in counterbore 64 in a gaseous-tight fit prior to attachment of lens assembly 26 and acts to seal lens sleeve 14 about bore 62. Testing has indicated that an O-ring seal integrity capable of meeting NEMA 4 hose down requirements are possible with this construction.

As can now be seen, housing 12, lens sleeve 14 and adjustment ring 16 interact to form a motive means which acts to move lens sleeve 14 in an axial direction relative to optical detector 28. As adjustment ring 16 is rotated and travels axially along external threads 46 of housing 12, lens sleeve 14 advances in the same axial direction due to the contact between flange 56 and groove 78. As adjustment ring 16 and lens sleeve 14 advance, lens assembly 26 also advances in the same axial direction as it is fixedly attached to lens sleeve 14. At the same time, housing 12 and locking ring 18 do not move.

Note particularly that while lens sleeve 14 moves axially as adjustment ring 16 is turned, lens sleeve 14 does not rotate. Lens sleeve 14 does not rotate because resilient O-ring 24 functions as a stabilizing means, due to the frictional force of O-ring 24 against the inner cylindrical surface 38 of housing 12 and annular groove 70 of lens sleeve 14. As a result, the assembly 10 is focused without rotation of the lens assembly 26, which allows for the tight accuracy required in the machine vision industry to be achieved, without the need for costly parts being machined to small tolerances as discussed above. After focusing adjustments are made, the locking ring 18 is then rotated and tightened to maintain focus even under the harsh vibration conditions that may be experienced in industrial applications.

Although a presently preferred embodiment of the present invention has been described and illustrated in detail, it is clearly understood that the same is by way of illustration and example only and is not to be taken by way of limitation. The spirit and scope of the present invention are limited only by the terms of the appended claims and their proper equivalents.

What is claimed is:

1. In an industrial vision system, a sealed focusing assembly comprising, an elongated cylindrical housing having an externally threaded first portion, a second portion, and an inner cylindrical surface, an elongated cylindrical lens sleeve coaxial with the housing and slidably disposed within the housing, the lens sleeve having an open front end and an open rear end, and an outer surface, an optical detector attached to the lens sleeve proximate the open front end of the sleeve and in luminous contact with the optical detector, motive means in threaded connection with the housing for advancing the lens sleeve in an axial direction relative to the optical detector, a resilient O-ring in gaseous-tight contact about the fixed focus lens assembly, and stabilizing means in frictional connection between the lens sleeve and the housing whereby, the stabilizing means prevents the lens sleeve from rotating as the lens sleeve is axially advanced.

2. The sealed focusing assembly of claim 1 wherein the stabilizing means comprises a resilient O-ring in tight frictional contact with an annular groove in the outer surface of the lens sleeve proximate the rear end of the sleeve, and in tight frictional contact with the inner cylindrical surface of the housing, wherein the O-ring forms a gaseous-tight seal between the housing and lens sleeve.

3. The sealed focusing assembly of claim 2 wherein the motive means comprises an elongated cylindrical adjustment ring having an open front end and open rear end, said adjustment ring being coaxial with the housing, being in threaded internal contact with the first portion of the housing and being rotatably connected to the lens sleeve, and an elongated cylindrical locking ring coaxial with the housing, being in threaded internal contact with the first portion of the housing and capable of locking the adjustment ring to maintain the focus of the sealed focusing assembly.

4. The sealed focusing assembly of claim 3 wherein the motive means further comprises an internal annular groove in the adjustment ring proximate the open front end of the ring, an external annular flange on the lens sleeve defining two annular shoulders proximate the open front end of the sleeve and being adapted to rotatably fit within the annular groove of the adjustment ring, and an internal annular flange in the housing proximate the second portion of the housing being in axial contact with the rear end of the lens sleeve, wherein as the adjustment ring is rotated and advances axially relative to the optical detector, the annular groove in the adjustment ring, and the annular flange on the lens sleeve cooperate to advance the lens sleeve in the same axial direction.

5. A focusing assembly for a vision system, comprising:
a cylindrical housing with an inner cylindrical surface, said cylindrical housing having an externally threaded first portion and a second portion;
a cylindrical lens sleeve which is coaxial with an slidably disposed within said cylindrical housing, said lens sleeve having an outer surface, an open front end and an open rear end, said open rear end being shaped to receive an optical detector in attachment at a detector position proximate thereto;
a lens assembly attached to said lens sleeve proximate said open front end;
means for advancing said lens sleeve axially relative to said detector position; and means for inhibiting said lens sleeve from rotating relative to said cylindrical housing when said lens sleeve is advanced axially.

6. The assembly of claim 5, wherein:

said inhibiting means comprises an O-ring disposed between an outer surface of said cylindrical lens sleeve and said inner cylindrical surface of said cylindrical housing.

7. The assembly of claim 6, wherein:

said O-ring is disposed in a groove formed in said outer surface of said cylindrical lens sleeve.

8. The assembly of claim 5, wherein:

said advancing means comprises a cylindrical adjustment ring having an inner threaded surface disposed in mesh association with said externally threaded first portion.

9. The assembly of claim 8, wherein:

said cylindrical adjustment ring comprises an inner groove formed in an inner cylindrical surface thereof, said inner groove being shaped to receive an external annular flange of said cylindrical lens sleeve in sliding association therein.

10. The assembly of claim 5, further comprising:

means for locking said advancing means at a fixed position relative to said first portion.

11. The assembly of claim 10, wherein:

said locking means comprises a locking ring disposed in coaxial association with said advancing means and in mesh relation with said threaded first portion.

12. The assembly of claim 5, wherein:

said vision system is part of an industrial sensing system.

* * * * *